United States Patent [19]

Storm et al.

[11] 4,049,207
[45] Sept. 20, 1977

[54] FORAGE HARVESTER DRIVE

[75] Inventors: Donald P. Storm, Hinsdale; Peter Sammarco, Downers Grove; Edward A. Fritz, Hinsdale; Robert J. Mackert, Downers Grove, all of Ill.

[73] Assignee: International Harvester Company, Chicago, Ill.

[21] Appl. No.: 657,515

[22] Filed: Feb. 12, 1976

[51] Int. Cl.$^2$ .............................................. B02C 18/24
[52] U.S. Cl. .................................. 241/101.7; 74/15.4; 241/222
[58] Field of Search ...................... 241/34, 101.7, 222; 74/15.4, 15.8, 665 R, 665 F, 665 G

[56] References Cited

U.S. PATENT DOCUMENTS

| 3,444,673 | 5/1969 | Evans ................... 241/222 X |
| 3,523,411 | 8/1970 | Waldrop et al. ............ 241/34 |
| 3,732,740 | 5/1973 | Fell et al. ............ 74/15.4 X |
| 3,739,559 | 6/1973 | Long et al. ............ 241/101.7 X |

*Primary Examiner*—Roy Lake
*Assistant Examiner*—Howard N. Goldberg
*Attorney, Agent, or Firm*—Dennis K. Sullivan; Floyd B. Harman

[57] ABSTRACT

A forage harvester of the type having a rotary reel cutterhead and a feed roll mechanism for feeding crops to the cutterhead is provided with improved drive means for the feed roll mechanism including a forward chain drive arrangement incorporating intermediate shafts and an electromagnetic clutch and a reverse chain drive arrangement incorporating a second electromagnetic clutch, both drive arrangements being driven from the cutterhead drive and driving a common output shaft operatively connected with the feed roll mechanism. An electrical remote control switch operates the electromagnetic clutches for mutually exclusive engagement, or with neither clutch engaged, to produce remotely controlled shifting of the mechanism between forward, idle and reverse drives.

9 Claims, 6 Drawing Figures

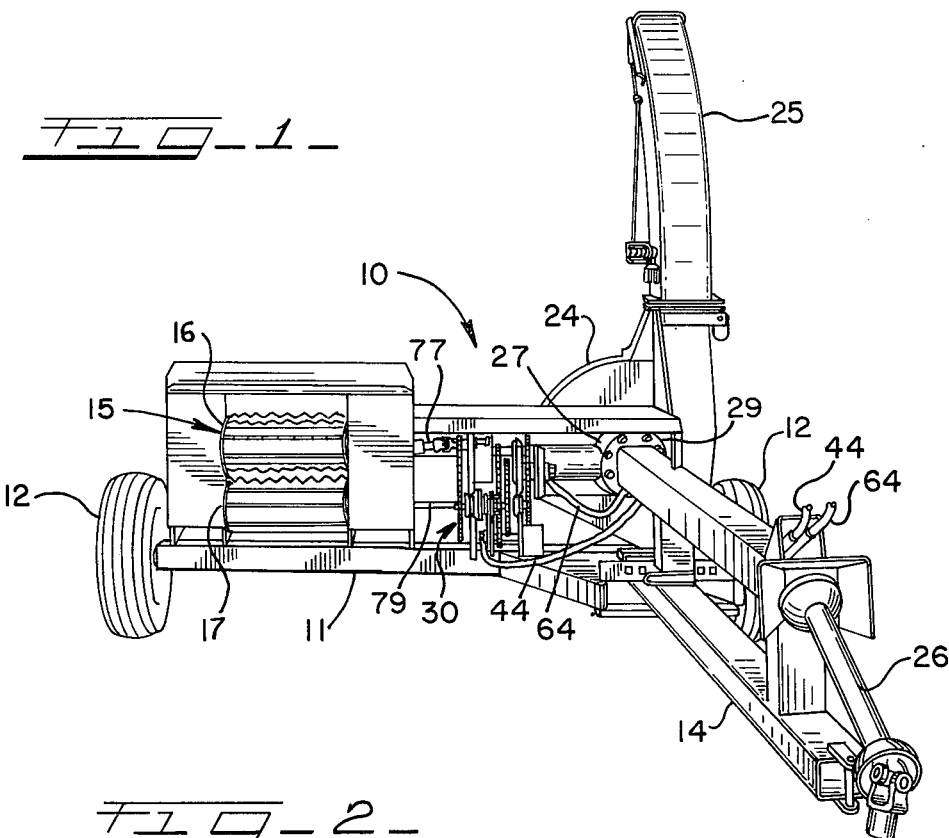
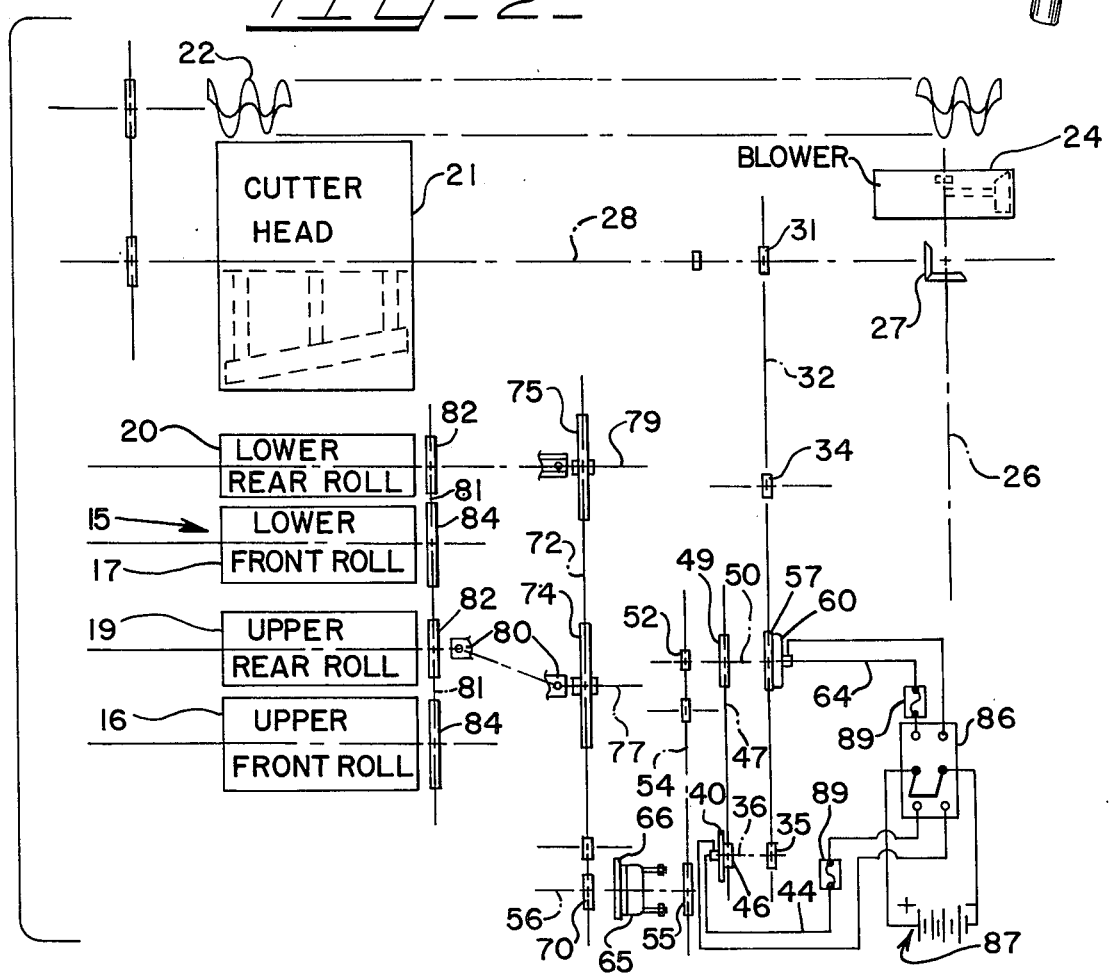

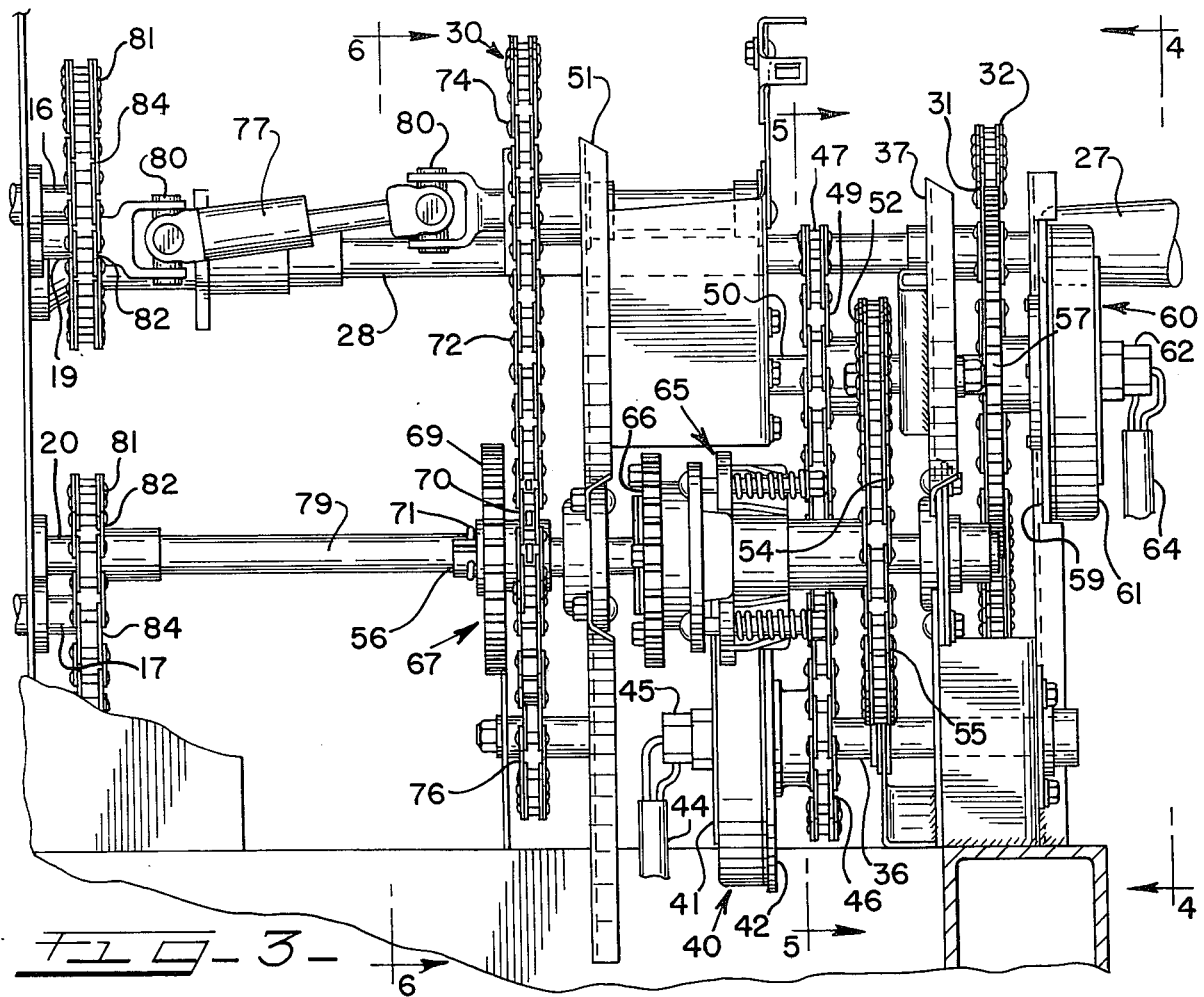
FIG-3-
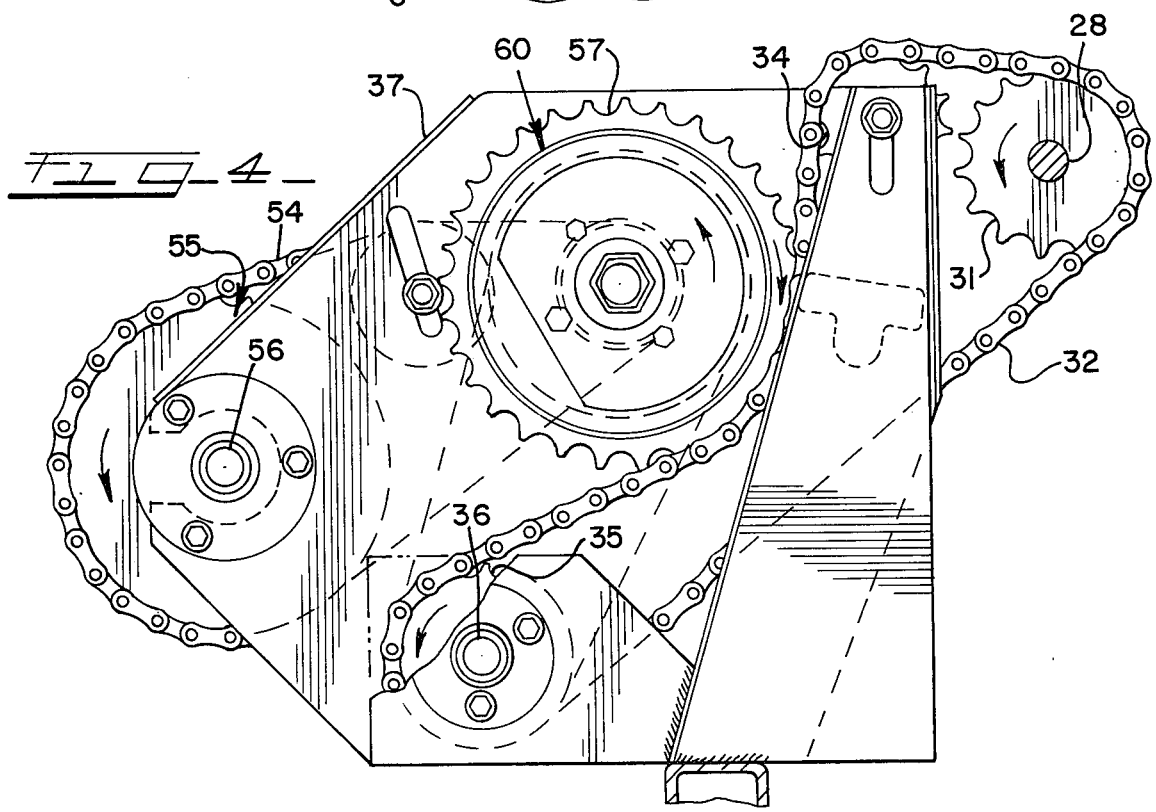
FIG-4-

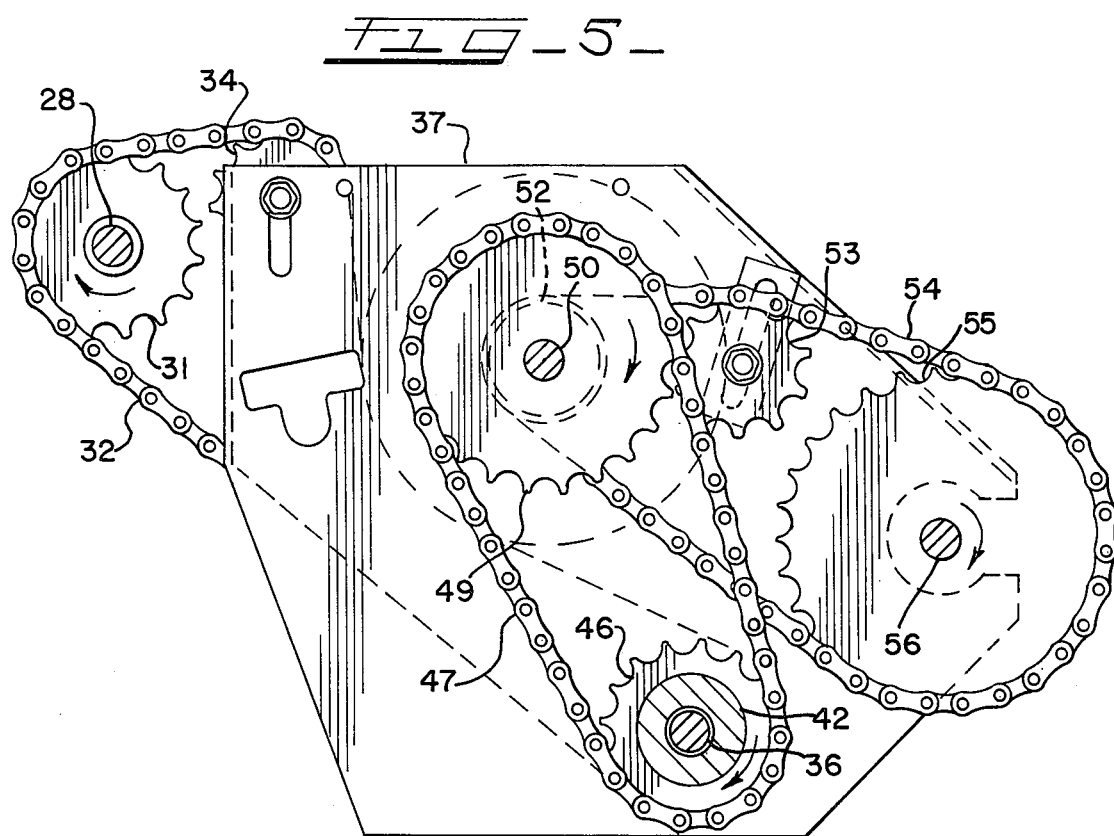
FIG_5_
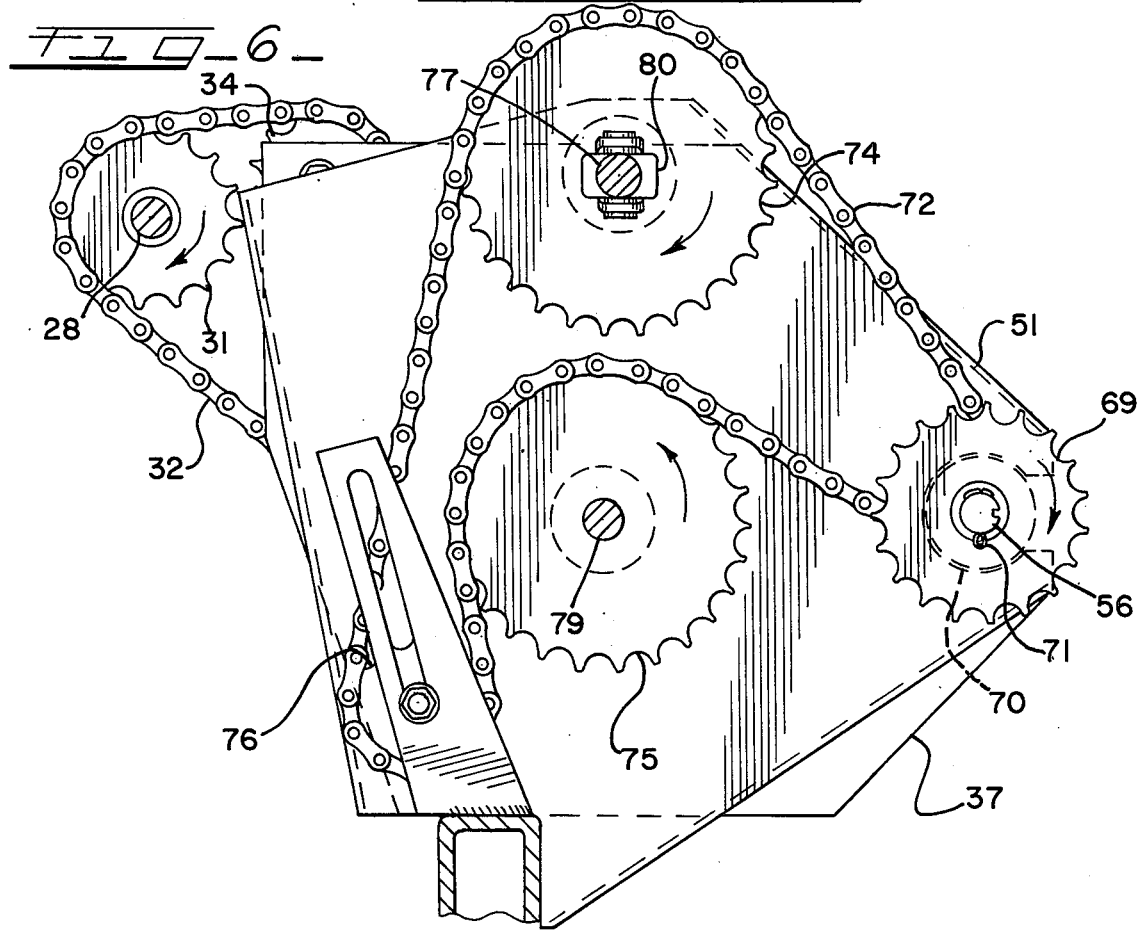
FIG_6_

FORAGE HARVESTER DRIVE

BACKGROUND OF THE INVETION AND THE PRIOR ART

This invention relates to forage harvesters of the type having a rotary reel cutterhead and a feed roll mechanism for delivering crops thereto obtain a uniform length of cut and, more particularly, to an improved driving arrangement for the feed roll mechanism.

Two important characteristics which are desirable in a forage harvester feed roll drive are the capability to provide a reverse drive for clearing blockages, as well as forward and neutral drives, and the ability to remotely actuate the shifting of the drive from one drive condition to another. The latter becomes increasingly important with the trend to enclosed tractor cabs dictated by increasingly lower noise level requirements.

In the past, feed roll drives for forage harvesters have generally included a mechanical transmission having a gear type shifting mechanism enclosed in a gearbox and a gear or chain speed reduction for driving the feed rolls in forward, neutral, and reverse. The transmission is usually driven from the cutterhead drive to provide a fixed speed ratio, which may be varied by changing sprockets in the chain drive, to produce uniform lengths of cut. Such a mechanical transmission is illustrated, for example, in Long et al. U.S. Pat. No. 3,739,559 and numerous others. It is also known to provide remote control for these mechanical transmissions, generally a mechanical linkage or a hydraulic cylinder, which may be electrically actuated, controlled from the tractor cab and controlling a shifting lever on the gearbox. While these feed roll drives accomplish their intended ends, they can also be costly.

Accordingly, it is an object of the invention described and claimed herein to provide an improved forage harvester feed roll drive mechanism which will provide forward, neutral, and reverse drives and remote control while being less expensive than the conventional transmission.

It is a more specific object to provide an improved feed roll drive mechanism wherein an open chain drive is combined with a pair of electric clutches to produce forward, reverse, and neutral drive conditions and a convenient means for remotely controlling the shifting from one condition to the other.

It is a further specific object of the invention to provide such a forage harvester feed roll drive means wherein the reversing gearbox is eliminated.

These and other objects of the invention are met in a forage harvester having a rotary reel cutterhead, a feed roll mechansim for feeding crops to the cutterhead, and drive means for the feel roll mechanism including a forward chain drive mechanism incorporating intermediate shafts and an electromagnetic clutch and a reverse chain drive mechanism incorporating a second electromagnetic clutch, both drive mechanisms being driven from a common input shaft which also drives the cutterhead and driving a common output shaft, the output shaft being operatively connected with the feed roll mechanism, and electrical remote control means for operating the electromagnetic clutches for mutually exclusive engagement or with neither clutch engaged.

Among the advantages of such a drive mechanism are the simplicity of control of the drive mechanism and the elimination of the gearbox which becomes practical with the elimination of the gear shifting mechanism of the prior art transmissions.

A further advantage of the feed roll drive mechanism presented herein is that less severe impact loading on the drive mechanism during shifting will occur, especially when shifting directly from forward to reverse, than the impact loadings experienced with a gear shifting mechanism, particularly one using a gear type speed reducing mechanism as well. Drive chains have a tendency to flex somewhat when tensile loads are imposed. While the period over which this occurs is indeed brief, it still tends to extend the period of pickup of the load over that occurring in a gear mechanism. Moreover, forage harvester drives are commonly provided with jaw clutch mechanisms for picking up the load or, in the case of the Long et al. patent, a reversely spinning gear which engages another gear. In either case, the drive coupling is immediately positive whereas with electromagnetic clutches, there is some slippage as the load is picked up which again extends the interval over which the mechanism is loaded, thus reducing impact loads and extending the life of the various drive elements.

DESCRIPTION OF THE DRAWINGS

Other objects and advantages will become apparent from a consideration of the detailed description of the preferred embodiment of the invention and from the drawings in which:

FIG. 1 is a front view of a forage harvester, without a gathering unit for clarity, incorporation our invention;

FIG. 2 is a schematic diagram of the drive train of the forage harvester of FIG. 1;

FIG. 3 is an enlarged view partially in section of a portion of the harvester of FIG. 1 and illustrating the feed roll drive mechanism;

FIG. 4 is a side view, partially in section, of the feed roll drive mechanism of FIG. 3 taken along the line 4—4 thereof;

FIG. 5 is a sectional view of the feed roll drive mechanism of FIG. 3 taken along the line 5—5 thereof; and FIG. 6 is a sectional view of the feed roll drive mechanism of FIG. 3 taken along the line 6—6 thereof.

DETAIL DESCRIPTION OF THE PREFERRED EMBODIMENT

In the following description, the terms "right" and "left" are taken as viewed by a person standing behind the harvester facing forwardly in accordance with the convention in the art. Thus, with regard to FIGS. 1, 2, and 3 the left side of the drawing is the right side of the harvester.

Turning now to FIG. 1, there is shown a forage harvester basic processing unit generally designated 10 which includes a main frame 11 supported on the right and left sides by wheels 12. A fore-and-aft extending hitching tongue 14 is pivotallly mounted to the left side of the frame 11 and extends forwardly whereat it is adapted for connection to a tractor drawbar (not shown) so that the forage harvester 10 may be trailed outboard and rearwardly of a tractor as is customary in the art.

The basic operating structure of the forage harvester 10 is illustrated schematically in FIG. 2 and includes a feed roll mechanism 15 mounted on the right side of the frame 11 which includes a front set of opposed upper and lower feed rolls 16 and 17 and a rear set of opposed upper and lower feed rolls 19 and 20 in sequential order. Crops are fed between the roll sets 16, 17 and 19, 20 to a cutterhead 21 of the rotary reel type wherein they are chopped into relatively short uniform lengths, dependent on the peripheral velocities of the cutterhead 21 and the feed rolls, and are discharged to a transverse auger 22. The crop is then moved laterally to the left side of the frame 11 by the auger 22 to a blower elevator 24 which lifts the crop and blows it rearwardly through spout 25 into a trailing forage wagon (not shown). The right side of the frame 11 is also adapted to receive a crop gathering attachment (not shown) of the type generally known in the art for delivering the crop to the feed roll mechanism 15.

Motive power for the various mechanisms of the forage harvester 10 is derived from the tractor, which may pull it, through a power take-off (PTO) shaft 26 which delivers its power to a right angle drive 27, a conventional overload clutch 29 being interposed therebetween. Connected to the right angle drive 27 and extending transversely to the cutterhead 21 is a cutterhead drive shaft 28. The blower 24 is driven from the rear of the right angle drive 27 and the cross auger 22 is chain driven from the right side of the cutterhead shaft 28. Thus, except under overload or plugging conditions, the cutterhead 21, cross auger 22 and blower 24 always rotate when power is supplied to the PTO shaft 26.

The feed roll drive mechanism 30 comprises an input sprocket 31 which is fixed for rotation to the cutterhead drive shaft 28. An input drive chain 32 is mounted on the sprocket 31 and extends around a tightening idler 34 to an input sprocket 35 (FIG. 4) mounted on the forward drive shaft 36. It will also be noted that the input drive chain 32 is backwrapped about another sprocket, the reverse sprocket 57, but such will be described hereinafter in connection with the reverse drive. The forward drive shaft 36 is rotatably mounted as by bearings to an upstanding plate 37 welded to the frame 11 in a fore-and-aft plane and extends leftwardly to a first electromagnetic clutch 40. The clutch 40 has a field housing 41 keyed to the drive shaft 36 and an armature 42 mounted about the shaft 36 for rotation relative thereto. Since the field housing 41 rotates with the shaft 36, electric current to energize the field is supplied through an electric lead 44 to a slip ring assembly 45 mounted on the field housing 41. The specific clutch utilized herein is a standard rotating field type clutch. Integral with the armature 42 is an output sprocket 46. Thus, when power is supplied to the shaft 36, the field housing 41 constantly rotates and when the electromagnetic clutch 40 is energized, a driving coupling is established between the forward drive shaft 36 and the output sprocket 46 and power is transferred therebetween.

A forward drive chain 47 is entrained about the output sprocket 46 and extends upwardly to a forward input sprocket 49 fixed to a countershaft 50 which is rotatably mounted between the upstanding plate 37 and a second upstanding plate 51 welded to the frame 11 in parallel relationship therewith. Integral with the forward input sprocket 49 is a countershaft output sprocket 52 about which unit drive chain 54 is entrained, the chain 54 extending about a tightening idler 53 to a sprocket 55 mounted on the unit drive shaft 56 which is rotatably mounted between the two upstanding plates 37 and 51. Thus, as may be seen from the arrows in the drawings which are all oriented to forward drive, when the electric clutch 40 is energized, power flows from the cutterhead shaft 28 to the forward drive shaft 36 through the electric clutch 40 mounted thereon to the countershaft 50 and thence to the unit drive shaft 56 to rotate it in the forward direction.

To produce reverse drive of the unit drive shaft 56, a reverse drive sprocket 57 is rotatably mounted on the countershaft 50 and engages the input chain 32 externally thereof to produce a backwrapping of the chain 32 thereabout and provide a reverse relative rotation thereof from that of the forward drive shaft 36. Integral with the reverse sprocket 57 is the armature 59 of a reverse electromagnetic clutch 60 having its field housing 61 keyed to the countershaft 50 and having a slip ring connection 62 for an electrical lead 64 which energizes the field to produce a driving coupling between the reverse sprocket 57 and the countershaft 50. For the sake of convenience, the electromagnetic clutch 60 is identical to the electromagnetic clutch 40 although it carries less load. Thus, when the reverse clutch 60 is energized and the forward drive clutch 40 is not energized, power is transmitted from the input chain 32 to the reverse sprocket 57 and through the reverse clutch 60 to the countershaft 50 which is rotated in the reverse direction of the arrow. The output sprocket 52 on the countershaft 50 thus causes the unit drive shaft to rotate in reverse.

Thus, a forward drive arrangement and a reverse drive arrangement having a common input and driving a common output are utilized, one of the drives being decoupled when the other is driving. It is important to note that the electromagnetic clutches 40 and 60 must never be engaged simultaneously since that would have the forward and reverse drives fightng each other and damage the mechanism. When one clutch or the other is engaged, the armature and field of the unengaged clutch will rotate in reverse directions. When neither clutch is engaged, the feed roll and unit drive is in an idle condition.

Examining the unit drive shaft 56 in greater detail, it will be seen from FIG. 3 that mounted on the shaft 56 between the upstanding plates 37 and 51 is a spring loaded torque limiting friction clutch assembly 65 having a portion fixed to the shaft 56 and its other portion mounted for relative rotation thereto upon overload conditions and carrying a unit drive sprocket 66. The sprocket 66 is adapted to drive the various mechanisms on the gathering unit (not shown) which may harvest and deliver crop to the feed roll mechanism 15.

The unit drive shaft carries on its right end a cut length sprocket assembly 67 containing a large sprocket 69 and a small sprocket 70. The cut length sprocket assembly 67 is keyed to the shaft 56 and is held against axial movement thereon by a cotter pin 71 to permit end for end reversal of the assembly 67 to provide for an optional length of cut of the crops by varying the speed of the feed roll assembly 15. Obviously, additional feed roll speed variations could be provided with additional assemblies of various size sprockets. Only one of the sprockets 69, 70 are used at one time and to this end, a feed roll drive chain 72 is entrained about the sprocket 70 and extends upwardly and rearwardly (See FIG. 6) whereat each side of the chain is entrained about the upper side respectively of upper and lower roll drive sprockets 74 and 75 to produce counterrotation, the free end of the chain 72 being taken up about a tightening idler 76. The sprockets 74, 75 are fixed to upper and lower roll drive shafts 77, 79 respectively which are mounted for rotation on the upstanding plate 51 and rotate in opposite directions as per the arrows on FIG. 6. The upper roll drive shaft 77 is provided on the right side of the sprocket 74 with a pair of universal joints 80 and extends to a driving connection with the upper rear feed roll 19, the universal joints providing for upward movement of the feed roll axis to allow for varying thicknesses of crops passing between the upper and lower feed rolls. The lower roll drive shaft 79 extends directly to the rear feed roll 20 without universal joints since the axis of that roll is not moveable relative to the frame 11. Thus, the rear roll set is driven in counterrotating directions by the respective roll drive shafts 77, 79. The upper and lower front rolls 16, 17 are driven by their respective rear rolls by means of chains 81 entrained about rear roll sprockets 82 and front roll sprockets 84 mounted thereon.

The feed roll drive mechanism 15 is remotely controlled by a single throw, double pole electric switch 86 connected by electric leads 44 and 64, and ground leads, respectively to the electromagnetic clutches 40 and 60, the switch deriving its power from battery 87. It will be appreciated that the switch 86 will preferably be mounted in the cab of the tractor (not shown) pulling the forage harvester 10 and the battery 87 is the battery of that tractor. Fuses or circuit breakers 89 are installed in the respective electric leads 44 and 64 to prevent electrical overloading of the field windings of the clutches.

In operation, when power is supplied to the PTO shaft 26, usually at a constant speed, the cutterhead 21 is continuously rotated by its drive shaft 28 and the blower 24 and transverse auger 22 rotate by virtue of their driven connection with the right angle drive 27 and the cutterhead drive shaft 28 respectively, overloads in the system being taken up by the slip clutch 29. Assuming that neither electromagnetic clutch 40 or 60 is energized, none of the feed roll drive mechanism is operating, with the exception of the input drive chain 31, the forward drive shaft 36, and reverse sprocket 57 which are directly coupled with the cutterhead drive shaft 28, and the feed roll mechanism 15 and gathering unit drive sprocket 66 are in an idle condition.

When the remote control switch 86 is closed to energize the forward electromagnetic clutch 40, forward drive is established, the power being transmitted from the forward drive shaft 36 through the clutch 40 to the output sprocket 46 which drives the countershaft 50. The output sprocket 52 on the countershaft drives the unit drive shaft 56 which in turn drives the gathering unit sprocket 66 through the overload clutch 65 and also drives the cut length sprocket 70. The cut length sprocket 70 drives the upper and lower feed roll drive shaft 77, 79 in counterrotating directions which feed drive the feed roll mechanism 15 to move crops into the cutterhead 21. All parts of the mechanism rotate in the directions shown by the arrows on the various drawings, the nonenergized electric clutch 60 (FIG. 4) and reverse sprocket 57 rotating in opposite directions as shown. When the operator desires to reverse the feed roll and gathering unit mechanisms, for example to clear a crop blockage therein, the remote control switch 86 is set to energize the reverse electromagnetic clutch 60. This automatically deenergizes the forward clutch 40 to prevent both clutches from being simultaneously engaged and cuts off transmission of power from the forward drive shaft 36 to the forward drive sprocket 46. The reverse clutch 60 produces a coupling of the reverse sprocket 57 and the countershaft 50 causing the countershaft to turn in the opposite direction from the arrow in FIG. 5. The countershaft output sprocket 52 then causes the unit drive shaft 56 and in turn the feed roll drive shafts 77, 79 to rotate in the opposite direction from the arrows shown in FIG. 6 and the feed roll drive mechanism 15 and the unit drive sprocket 66 turn in the reverse direction while the cutterhead 21, transverse auger 22, and blower 24 continue to operate in the forward direction to clear themselves. Opening the switch 86 returns the feed roll drive mechanism to the idle condition.

Thus, it is apparent that there has been provided in accordance with the invention, an improved feed roll drive mechanism for a forage harvester that fully meets the objects aims and advantages set forth above. While the invention is described in conjunction with a preferred embodiment thereof, many alternatives, modifications, and variations will be apparent to those skilled in the art in light of the foregoing description. Accordingly, it is intended to embrace such alternatives, modifications and variations as fall within the spirit and scope of the appended claims.

What is claimed is:

1. In a forage harvester, said forage harvester including a cutterhead, drive means for said cutterhead, a feed roll mechanism including at least a pair of counterrotating rolls for delivering crops to said cutterhead, and a feed roll drive mechanism driven from said cutterhead drive means and driving said feed rolls, the improvement wherein said feed roll drive mechanism comprises two alternative power paths for transmitting power from said cutterhead drive means to produce forward and reverse drive of said feed rolls, each of said power paths including an electromagnetic clutch operably disposed therein to control the transmission of power therethrough, a source of electrical power for energizing said clutches, and remote switch means for supplying said electrical power for alternative exclusive engagement of each of said electromagnetic clutches to shift said feed roll mechansim from forward to reverse drive while maintaining forward drive to said cutterhead.

2. In a forage harvester having a rotary reel cutterhead, cutterhead drive means, and an infeed means for said cutterhead, the improvement comprising a gearless drive mechansim for said infeed means having a input drive means driven from said cutterhead drive means, a forward drive shaft driven by said input drive means, a first electromagnetic clutch operatively associated with said forward drive shaft to control the transmission of power therefrom, a countershaft having a driven connection with said forward drive shaft, a second electromagnetic clutch mounted on said countershaft and having means engaging said input drive means for reverse rotation relative to said forward drive shaft, said second clutch controlling the transmission of power from said input drive means to said countershaft, means establishing a driving coupling of said countershaft with said infeed means a source of electrical power, and remote switch means for operating said clutches for alternative engagement.

3. The invention in accordance with claim 2 and said infeed means drive mechanism comprising an open chain drive.

4. The invention in accordance with claim 2 and said means establishing a driving coupling between said countershaft and said infeed means including means adapted to drive an associated gathering unit.

5. In a forage harvester having a rotary reel cutterhead, cutterhead drive means, a feed roll mechanism for delivering crops to said cutterhead, and feed roll drive means driven from said cutterhead drive means, said feed roll drive means operating in forward, neutral, or reverse modes relative to said cutterhead drive means, the improvement wherein said feed roll drive means comprises:

a first chain drive mechanism for driving a drive shaft in said forward mode, said mechanism including a first electromagnetic clutch operatively associated therewith for controlling the transmission of power therethrough;

a second chain drive mechanism for driving said drive shaft in said reverse mode, said second chain drive mechanism including a second electromagnetic clutch operatively associated therewithh for controlling the transmission of power therethrough;

means operatively interconnecting said drive shaft with said feed roll mechanism;

electric power means for energizing said electromagnetic clutches; and remote switch means for operating said electromagnetic clutches for mutually exclusive engagement to effect said forward and reverse modes, said switch being further operable to disengage both of said clutches to effect said neutral mode.

6. The invention in accordance with claim 5 and said drive shaft including means to drive an associated gathering unit.

7. The invention in accordance with claim 5 and said first chain drive mechanism including an input drive chain, a forward drive shaft driven by said input drive chain including said first electromagnetic clutch, and a countershaft driven from said forward drive shaft, said drive shaft being driven from said countershaft.

8. The invention in accordance with claim 7 and said second chain drive mechanism including said input drive chain, a reverse sprocket driven by said input drive chain for reverse rotation relative to said forward drive shaft, and said countershaft, said second electromagnetic clutch being operatively disposed between said reverse sprocket and said countershaft.

9. In a forage harvester of the type including a mobile frame, a cutterhead mounted on said frame for chopping crops, drive means for said cutterhead, a feed roll mechanism having at least one set of opposed upper and lower feed rolls mounted on said frame forwardly of said cutterhead for delivering crops thereto, and feed roll drive means, the improvement wherein said feed roll drive means comprises an input drive chain driven from said cutterhead drive means, a forward drive shaft including an input sprocket, an output sprocket, and a first electromagnetic clutch operatively disposed between said sprockets, said forward drive shaft being driven by said input drive chain; a countershaft including a countershaft forward input sprocket chain driven by said output sprocket on said forward drive shaft, a countershaft output sprocket, a countershaft reverse input sprocket, said reverse input sprocket being engaged with said input drive chain for reverse rotation relative to said forward drive shaft, and a second electromagnetic clutch operatively disposed between said countershaft reverse input sprocket and said countershaft forward input and output sprockets; a unit drive shaft driven byy said countershaft output sprocket; a pair of counterrotating roll sprockets chain driven by said unit drive shaft; a pair of roll drive shaft operatively interconnecting said roll drive sprockets respectively with said upper and lower feed rollers; and remotely actuated power means for operating said electric clutches in one of three modes consisting of said first clutch engaged and said second clutch disengaged, said first clutch disengaged and said second clutch engaged, and neither clutch engaged.

* * * * *